United States Patent
Cheng

[11] Patent Number: 6,047,104
[45] Date of Patent: Apr. 4, 2000

[54] ELECTRICAL GENERATORS AND MOTORS IN WHICH AT STEADY-STATE THE ROTOR AND ITS ELECTROMAGNETIC FIELD ROTATE AT SELECTIVELY DIFFERENT ANGULAR SPEEDS

[75] Inventor: Dah Yu Cheng, Los Altos Hills, Calif.

[73] Assignee: Cheng Technology & Services, Inc., Mountain View, Calif.

[21] Appl. No.: 09/158,464

[22] Filed: Sep. 22, 1998

[51] Int. Cl.[7] .................................. H02P 7/00; H01R 39/44
[52] U.S. Cl. ........................ 388/835; 318/11; 318/245; 318/700; 310/229
[58] Field of Search .................... 318/9, 5, 15, 140, 318/145, 244, 245, 700; 310/229–234; 388/825, 826, 830, 835, 836

[56] References Cited

U.S. PATENT DOCUMENTS

| | | |
|---|---|---|
| 2,519,118 | 8/1950 | Curtis et al. . |
| 2,739,278 | 3/1956 | Blankenship . |
| 2,861,236 | 11/1958 | Blankenship . |
| 3,754,174 | 8/1973 | Shibata ........................ 318/9 |
| 3,789,281 | 1/1974 | Shibata ...................... 318/696 |
| 3,894,605 | 7/1975 | Salvadorini .................. 180/65.4 |
| 4,130,172 | 12/1978 | Moody ....................... 180/65.6 |
| 4,467,230 | 8/1984 | Rovinsky ..................... 310/83 |
| 5,160,868 | 11/1992 | Yang ......................... 310/230 |
| 5,562,566 | 10/1996 | Yang .......................... 477/3 |
| 5,804,935 | 9/1998 | Radev ........................ 318/139 |

*Primary Examiner*—Bentsu Ro
*Attorney, Agent, or Firm*—Cooper & Dunham LLP

[57] ABSTRACT

A rotating field, synchronized electric generator or motor in which the magnetic field that the armature produces can rotate relative to the stator at a speed significantly different from that of the armature, under electronic or other control that obviates the need for a mechanical torque-carrying gearbox that can be used for a similar purpose in a synchronized generator or motor.

22 Claims, 8 Drawing Sheets

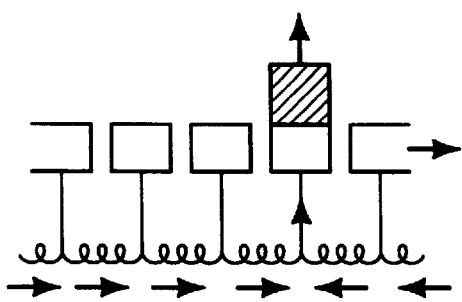
FIG. IIA
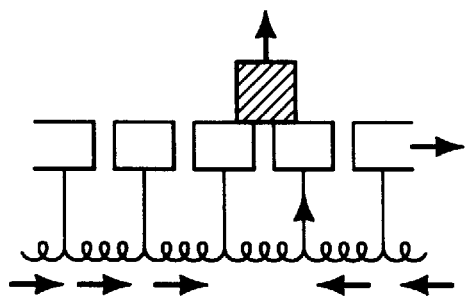
FIG. IIB
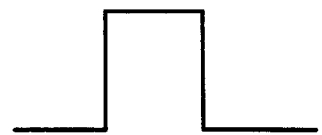
FIG. I2A
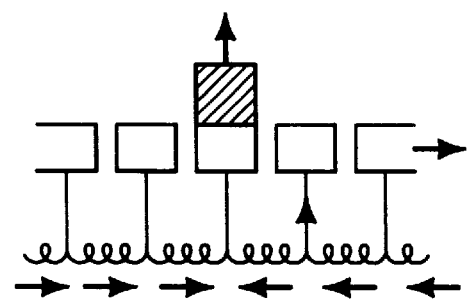
FIG. IIC
FIG. I2B
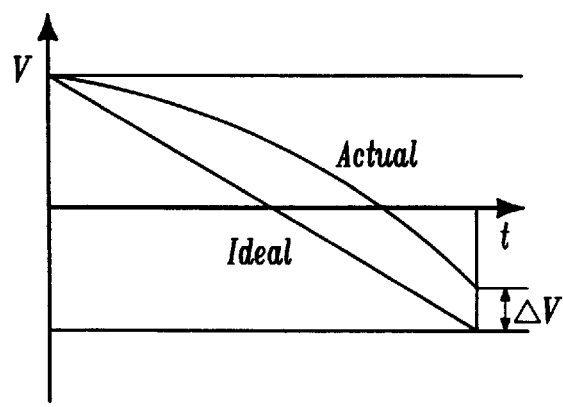
FIG. IID

ELECTRICAL GENERATORS AND MOTORS IN WHICH AT STEADY-STATE THE ROTOR AND ITS ELECTROMAGNETIC FIELD ROTATE AT SELECTIVELY DIFFERENT ANGULAR SPEEDS

BACKGROUND

1. Field

The system and method described in this patent specification are in the field of electric machines such as motors and generators and pertain more specifically to enabling such machines to operate at steady-state with a selective difference in angular velocity between the mechanical rotation of the rotor (armature) and the magnetic field it generates. Stated differently, at steady-state the rotation of the rotor's magnetic field (flux) is synchronized but the rotor's mechanical speed is selectively different so as to obviate the need for torque gearing when it is desired to have the rotor's mechanical speed different from the synchronization speed.

One example is the ability to drive an electric generator with a prime mover such as a turbine that works more efficiently at speeds higher than the typical synchronization speed of a power generator (e.g., at a speed higher than 3000 or 3600 rpm for electrical power at 50 or 60 Hz, respectively), without using torque-transmitting gearing between the prime mover and the generator.

2. Background

Electric motors and generators have been used for over a century, the principle dating back to Faraday and Fouquet. This principle can be simply stated: a current traveling along a wire in a magnetic field generates a force which pushes the wire relative to the field and thus converts electric power to mechanical force and, conversely, if a wire in a magnetic field is moved relative to the field by a mechanical force (greater than the electromagnetic force), a current in the wire or a voltage across the wire is generated and thus mechanical motion is converted to electric power. To satisfy the various requirements of energy generation standards, different forms of electric generator/motor systems have been devised. Broadly categorized, the electric machines serving as generators or motors are: (1) direct current (or DC) (2) alternating current (or AC) and (3) induction type. All of them can be said to obey the electromotive principle of Faraday, as later more precisely described by Lenz, to the effect that an electric current-carrying wire subject to a magnetic field should produce a resultant force perpendicular to both the current and the magnetic flux.

A typical DC machine has a stator creating a stator magnetic field (flux) that is essentially stationary in space (or at least relative to the rotational axis of a rotor), and a rotor carrying armature windings terminated by commutator segments. Brushes make electrical contact with the commutator segments to carry electric power to the rotor armature windings and thereby generate a rotor magnetic field in the armature, the axis angle of which forms an angle with that of the stator field, producing electromotive force. After the armature has rotated through a certain angle, a new set of commutator segments makes electrical contact with the brushes to thereby continue to provide electromotive force. When at steady-state the armature is rotating in a fixed stator magnetic field, the magnetic field generated by the armature also is approximately fixed in space (moving only through an angle related to that of the commutator segments), but relative to the armature windings the field generated by the armature is rotating in the reverse direction at approximately the same angular speed as the rotor's mechanical speed. If the machine is operating as an electric motor, the higher the current through the armature windings the more torque it will generate. On the other hand, since the windings rotate in the fixed stator field, the armature winding should generate electric power too. The faster the rotation the higher is the power generated in this manner in the armature windings. This power ("back e.m.f.") counters the electric power applied through the commutators to reduce the current flow in the armature. This in effect prevents a typical DC motor from reaching run away speed r.p.m. (revolutions per minute). The combination of the stator magnetic field and armature field distorts the axis of the magnetic flux. Some higher quality DC motors can shift the brush position according to the rotating speed to improve efficiency and thus the output of the motor. This means that the brush position controls the axial direction of the armature field. Similarly, in the generating mode the brush sometimes is rotated according to the generator speed in order to improve electric output.

A typical AC generator/motor operates in a time varying field in that the field changes direction in space with time. If the commutator of a DC generator is exchanged for a pair of electric conducting rings with a pair of brushes in contact with them (to extract power from the rotating armature), then that becomes a typical AC generator.

If one reverses the position of the armature and the field magnetic field, the electric brushes can be eliminated. The power output is proportional to the magnetic field strength and the frequency is a direct function of rotating speed. This inversion is the basis of the design of a modern synchronized electric generator. The rotating magnetic field is fed DC current from a pair of slip rings and brushes. The adjustment of this current controls the electric power output. The advantage of the synchronized generator is that the rotating field does not cut across a designed-in fixed magnetic flux and therefore little or no back e.m.f. is generated. The system is further refined such that the current can be fed through a small AC generator rectified into DC current. The strength of the small AC generator is regulating its DC field strength. The small AC to DC generator can be mounted on the same shaft as the armature and the output is permanently connected to the armature feeds, thus eliminating the slip ring and the brushes. In the motor operating mode, a rotating field has to be provided—a convenient way of doing this is by using a 3-phase AC power with delta- or Y-windings. That AC machine rotates the magnetic field while the armature is in DC mode; in contrast to the DC machine which has the magnetic field in DC mode (or fixed) and the field rotating backwards in the armature.

An induction motor/generator has a rotating electric field that can be produced either by a 3-phase AC power source or by a single phase AC, but retarding a corner of the field by an inductive winding shorting to itself. A desirable simplicity of the motor is in the fact that the armature winding can be in the shape of squirrel cage. The current in the armature is induced or produced by the difference in rotating speed between the field and the armature. That difference is called the slip speed. If the induction motor is operating at synchronized speed, the conductors in the winding have no substantial interaction with the magnetic field and so no induced current to provide an operating force. Hence the induction motor has to be retarded relative to the field rotating speed or accelerated beyond it. Therefore, the induction machine is a mixed mode machine. It has the advantage of simplicity but can not be used conveniently as a constant speed or fixed frequency machine.

An AC synchronized machine links its rotating speed to line frequency so that the most a 60 Hz machine can rotate is at 3600 r.p.m., and a 50 Hz machine at 3000 r.p.m., or an integer fraction of that speed. This can create difficulties for the power generation industry and the machine designer in that the prime mover that drives a generator has to be operated at the synchronized speed also (except the induction generator which has to be given a reference frequency). With the advent of prime mover improvements, some prime mover engines can produce very high horse power if allowed to operate at very high r.p.m. This means one can reduce the engine weight only to have to add on a heavy, torque gear box, which would increase maintenance and cost.

SUMMARY

This specification describes a rotating field synchronized generator or motor that uses an electric or electronic control replacing the function of a heavy mechanical gearbox through which the prime mover drives the rotor so that the prime mover (either driver or driven) does not have to rotate at a speed directly linked to the electric power grid frequency. Changes between 60 Hz and a 50-Hz system are made relatively easy. With computer-controlled systems, the change over can be done relatively simply through software programming.

In an illustrative embodiment, electric power is supplied to the armature windings such that resulting electromagnetic field rotates at an angular speed that is selectively different from that of the rotor. Thus, the rotor's angular speed can be decoupled from the angular speed restrictions on the field that it produces. As a result, one example is that a high-speed turbine can drive the rotor of a generator at an angular speed at which the turbine is particularly efficient, without any mechanical gearing, while the resulting power induced in the stator windings is at the required power grid frequency, e.g., 50 Hz or 60 Hz. Another example is that a motor can be operated simply and efficiently at variable rotor speeds.

EXAMPLES OF ADVANTAGES

One advantage of the disclosed system is that it simplifies the machinery when a prime mover and an electric machine have different operating speeds, so that the gearbox either is removed or does not carry the torque of the output. The resulting package can be reduced in size, weight and cost.

Another advantage is the replacement of the mechanical gearbox with an electric or an electronic arrangement so that gear changing or automatic transmission can become a continuous process. This may change electric propulsion concepts for vehicles, ships and turbo propeller aircraft, spacecraft and other uses.

Another advantage is the conversion of high current DC motors into high voltage AC machines with relatively small electric conductors, saving weight. AC voltage can be changed more easily than DC, but conversion from DC to AC through today's electronic technology is relatively convenient.

Yet another advantage is the ability to operate electric systems at a frequency independent of shaft speed.

An advantage of a rotating field electric machines described in this patent specification is that it is essentially a synchronized machine without the shaft necessarily rotating at synchronized speed.

Another advantage of the machine is that it is synchronized and yet produces back e.m.f., which can serve as a means of regulating the feed current to keep rotating speed lower with low armature current or low torque. Such speed regulation can be a difficult problem when one needs to startup a large electric motor of a known type. The starting circuit can be very complicated and sometimes very difficult to operate.

Another advantage is the use of a non-contact coupling such as an optical coupling to replace brushes and commutators so that so-called brushless operation can be attained conveniently.

A solid state circuit can provide pulse or wave form shaping, alleviating the problem of the sudden discharge that tends to occur when two commutators are simultaneously in contact with the brush.

Yet another advantage of the system described in this patent specification is that it can be conveniently scaled up or down because a higher rotating speed with lower torque generates the same horse power and vice versa, further lightening the electric motor/generator.

DRAWINGS

FIGS. 11a–11d illustrate commutating action and a cause of an electric spark from the brush element.

FIG. 12a illustrates a waveform produced by a mechanical commutating system; and FIG. 12b illustrates a tailored waveform produced by electric wave shaping.

DETAILED DESCRIPTION

Figure 1:
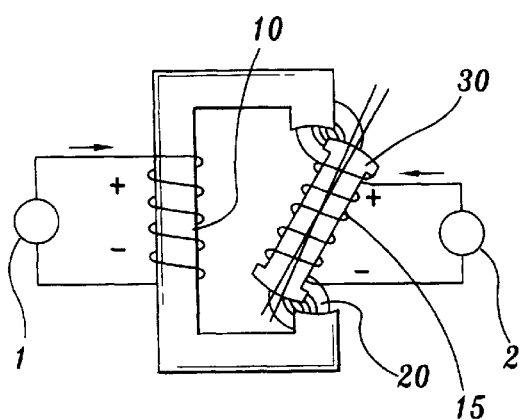
FIG. 1 illustrates fundamental principles of electromotive machines.

FIG. 1 illustrates in principle a typical electromotive interaction machine. A stator magnetic field 20 is the flux generated by a coil 10 powered by a DC source 1. The rotor or armature 30 generates a rotor flux from coils 15 connected to a source (or load) 2. The force of electric attraction rotates armature 30. If element 2 is a load and an engine (not shown) drives armature 30 to rotate it relative to stator coil 10 at a suitable angular speed, electric power will be generated in coils 15 and supplied to load 2. If element 2 is instead a source of a suitably changing current supplied to coils 15, rotor 30 will rotate relative to stator coil 10.

Figure 2:
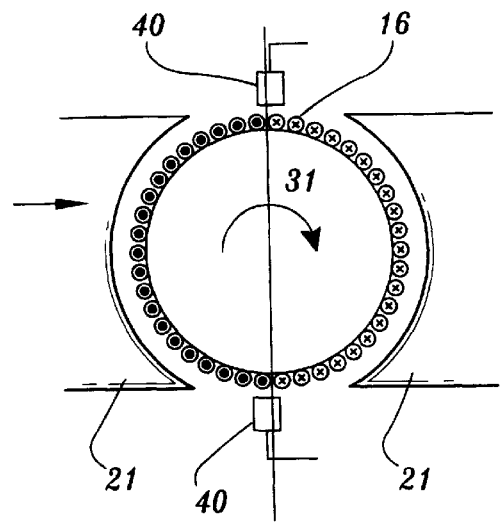
FIG. 2 illustrates in principle the configuration of a typical direct current motor or generator.

FIG. 2 illustrates in principle a DC motor/generator using a DC magnetic field 21 that can be generated by a permanent magnet. A rotor 31 is equipped with armature windings 16, where an x symbol indicates that the current is going into the wire and a dot symbol indicates current coming out of the wire. Brushes 40 feed current to the armature windings 16 as rotor 31 rotates. In operation in steady-state as a motor, supplying suitable polarity power to windings 16 through brushes 40 creates a rotor magnetic field that rotates rotor 31 relative to stator field 21. In steady-state operation as a generator, rotating rotor 31 relative to stator field 21 induces current in windings 16 that is taken to a load (not shown) through brushes 40.

Figure 3:
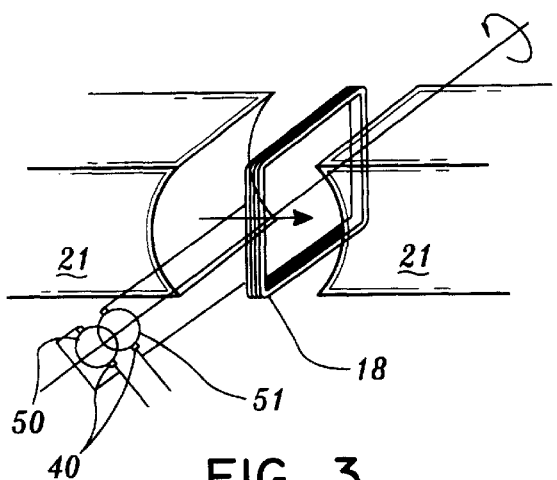
FIG. 3 illustrates in principle a typical alternating current generator.

FIG. 3 illustrates in principle an AC generator. Stator field 21 is a DC or a permanent magnet field. Armature coil 18 connects to slip rings 50 and 51 to pick off the current and voltage when armature coil 18 is rotating in stator magnetic field 21. The rotation of armature coil 18 generates a sinusoidal waveform matching a standard AC waveform.

Figure 4A:
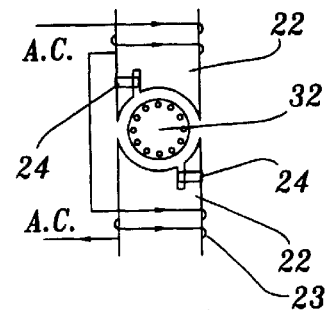
FIG. 4a illustrates in principle a cross sectional view of a typical induction motor/generator.

FIG. 4a illustrates in principle an induction motor/generator. A rotating field is produced by a single phase AC power source through a stator field winding 23 around poles 22. A time retarding short circuit coil 24 is located at a corner of poles 22 creating the rotating stator field motion. The rotor is an armature in the form of a squirrel cage 32 rotating at a different frequency to the AC frequency applied to field windings 23 to produce an inductive current; and the resulting interacting forces push or pull rotor 32 along. When rotor 32 is rotating at a lower speed that the speed of the rotating stator field, the differential speed produces current in the squirrel cage. This is how an induction motor works. On the other hand, when the rotor is driven at a higher speed than the rotating field, the system becomes a generator.

Figure 4B:
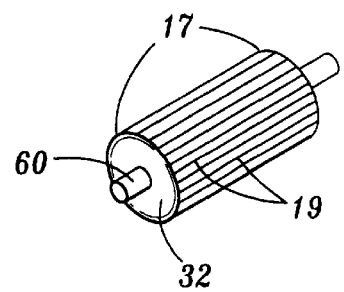
FIG. 4b is a 3-dimensional view illustrating a squirrel cage rotor/armature of an induction motor/generator.

FIG. 4b is a 3-dimensional view of armature 32 having straight conductors 19 rather than winding, terminated at their ends 17, and a shaft 60 supporting the rotor structure for rotating motion.

Figure 5A:
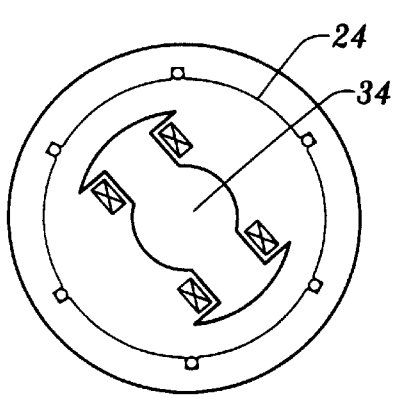
FIG. 5a illustrates in principle a cross sectional view of a two pole, synchronized, 3-phase electric generator/motor.
Figure 5B:
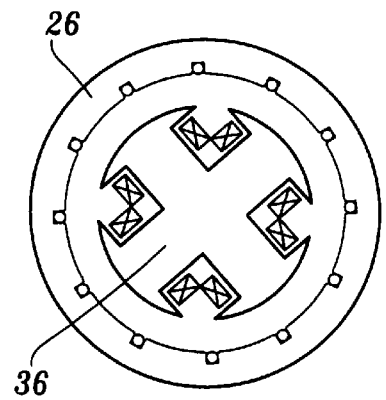
FIG. 5b illustrates in principle a cross sectional view of a four pole electric generator/motor.
Figure 5C:
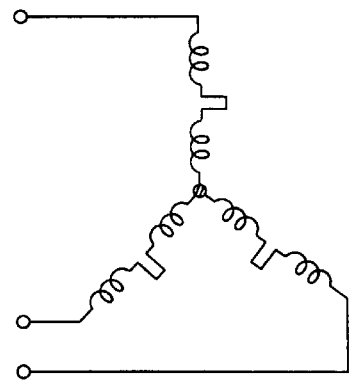
FIG. 5c illustrates the field configuration symbol of a 3-phase electric field winding.

FIG. 5a is a cross section illustrating a synchronized generator/motor with two poles and a 3-phase stator field winding 24 and a rotor 34 producing a rotating DC magnetic field by means of coil around the rotor. These rotor coils also serve as a means to control the operation. Since the rotor is synchronized with the stator field, there is essentially no induced current or back e.m.f. FIG. 5b is a cross section illustrating a four pole synchronized generator with a rotating field 26 on the outside and a rotor 36 with four poles. This has the same electrical frequency as the two-pole machine but the rotor physically rotates at half the speed of that of the two-pole machine of FIG. 5a. FIG. 5c is the symbol of a three-phase field winding; the angles between the wires in the symbol represent the angle between the phases.

Figure 6:
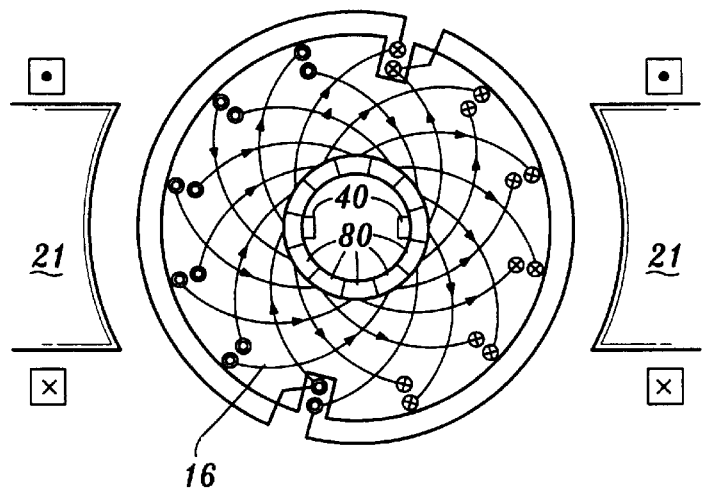
FIG. 6 illustrates a cross sectional view of a DC motor/generator and a typical winding and commutator structure.

FIG. 6 illustrates a cross section of a commutating DC motor in which a stator generates a DC field 21 and a rotor 16 has a typical winding geometry with commutator segments 80 and contacting brushes 40. Each commutating segment usually connects to two sets of armature coils.

Figures 7A, 7B:
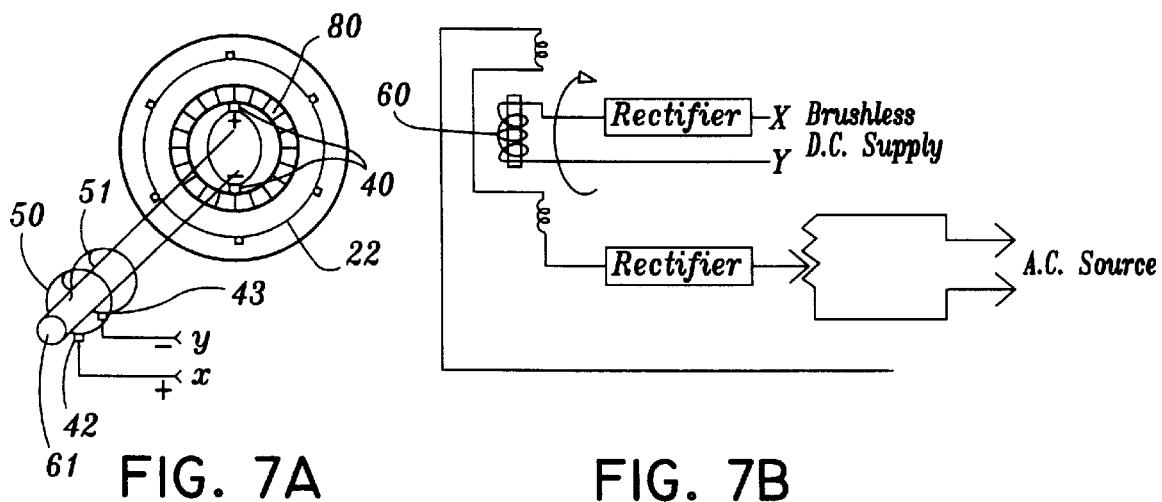
FIG. 7a illustrates a rotating field 3-phase generator/motor.
FIG. 7b illustrates a circuit to feed the current to the rotating field armature that is the same or similar to a circuit used for a synchronized generator/motor in brushless operation.

FIG. 7a illustrates principles of the rotating field generator in cross section. The arrangement of the outside rotating field at stator coils 22 is the same as for a 3-phase AC generator/motor. The rotating field can be a single phase system as for the induction type or any other type electric machine. The rotor inside is a typical commutating type of rotor system with commutator segments 80 and brushes 40 in contact with commutator segments 80, except that brushes 40 are mounted on a shaft 61 concentric to the rotor and rotating at a speed synchronized to that of the outside field. Brushes 40 are further connected to a pair of slip rings 50 and 51. Current is connected to the slip rings through brushes 42 and 43. Power supply from a DC source (not shown) supplies the necessary current. The difference to the prior art synchronized generator as show in FIG. 5a is that the rotor can be rotated at a different speed to the AC power, so it does generate a back e.m.f. voltage. Therefore, the field controller is a current feedback circuit whereas the prior art system can be voltage controlled without feedback. The back e.m.f. voltage of this design limits the onrush of current that occurs when an induction motor is first started. When the rotor is rotating at the same synchronized speed there is essentially no more back e.m.f. voltage and then the generator works in the same way as the synchronized machine. If the rotor is rotating at higher than synchronized speed (a condition anticipated for small gas turbines and high-speed gasoline engines), the higher the rotor speed the higher would be the back e.m.f. voltage (or lower the current at a constant voltage power supply), thus reducing the electromotive forces or decelerating the rotor as a motor. This means the speed of the rotor can be self-limiting. As a generator, the opposite effect occurs, requiring a feedback control circuit to increase the applied voltage at a higher rate than the rotor acceleration to provide the self-adjusting effect. On the other hand, as a generator the speed control is usually provided by the engines themselves, hence it is not a problem. It is anticipated that the same brushless circuit can be applied with or without modification to replace slip rings 50 and 51 and brushes 42 and 43.

FIG. 7b illustrates that a small AC generator can be mounted on the same shaft 61 as the rotor, rectifying the AC power to DC and supplying current to the rotating magnetic coil in FIG. 7a without a slip ring. This is thus known as the brushless generator.

Figures 8A, 8B:
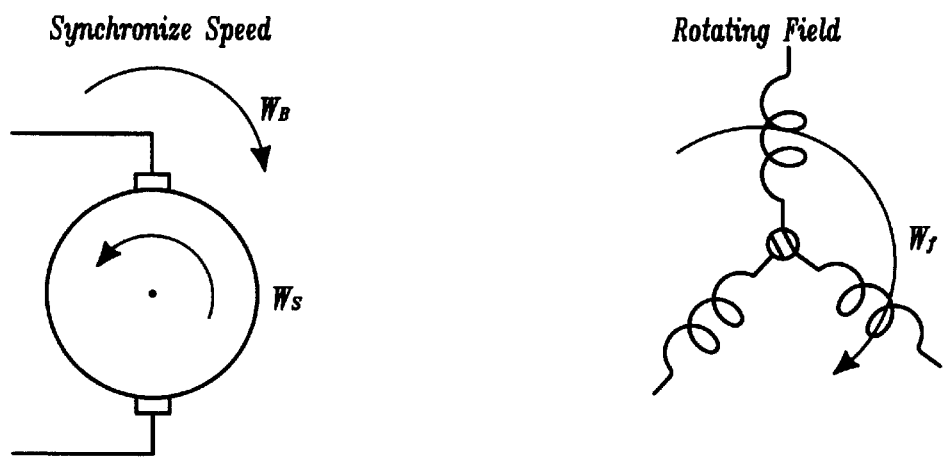
FIGS. 8a and 8b illustrate the armature field (controlled by brush and commutator position) that is rotating at a speed synchronized to the 3-phase rotating field speeds, which can be different from the rotor speed.

FIGS. 8a and 8b illustrate an example where the brushes are rotating in the same direction and speed as the field (i.e. synchronized) yet the rotor can be driven in the opposite direction. When this arrangement is operating as a generator, the back e.m.f. voltage is in series (additive) with the applied voltage, hence producing the same limiting torque. In all cases, the brush position determines the axis direction of the rotor magnetic field. The brush speed is indicated as $\omega_b$, the rotating magnetic field speed as $\omega_f$, and the rotating shaft speed as $\omega_s$. $\omega_s$ can be different from $\omega_f$, but $\omega_b$ equals $\omega_f$.

Figure 9A:
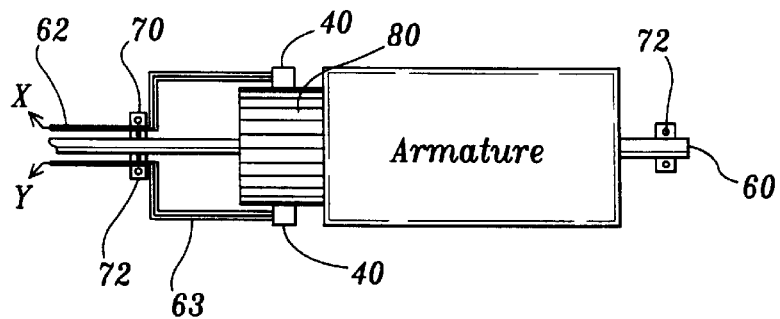
FIG. 9a illustrates a mechanical rotating brush arrangement.
Figure 9B:
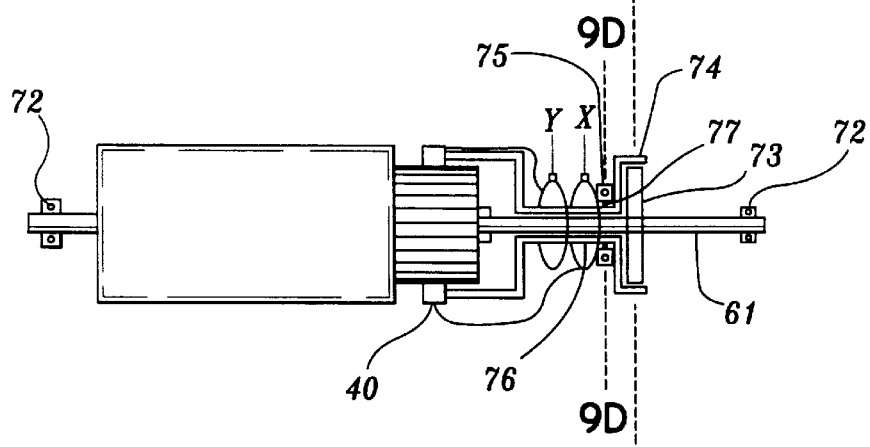
FIG. 9b illustrates a typical gearing arrangement to drive the brush with the rotating shaft.
Figure 9C:
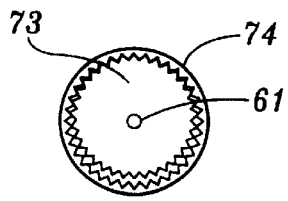
FIG. 9c is an end view of a typical gearing arrangement.
Figure 9D:
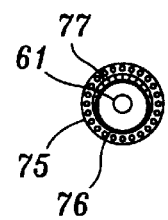
FIG. 9d is a sectional view illustrating a detail of FIG. 9b.

FIG. 9a illustrates a typical mechanical arrangement in which there can be a selective difference in angular speed between the mechanical rotation of the rotor and the rotation of the electromagnetic field it generates. The armature shaft 60 is supported by bearings 72 but brushes 40 are mounted on a different structure 63 having a shaft 62 supported by a separate bearing 70 and coaxial with armature shaft 60. FIG. 9b illustrates the use of a gear system having gears 74 and 73 to couple rotating brushes 40 supported by a bearing 75 to the armature shaft 60, making the structure an electrically coupled synchronized generator. This is further illustrated in FIG. 9c, where it can be seen that the gear system does not carry the machine's torque load. FIG. 9d illustrates in cross section the position of a connecting rod 76 connecting the rotating brushes 40 and the outer gear 74, which is coupled to electric terminals X and Y. Since the connecting rod 76 is not concentrically arranged around the shaft 61, a spacer 77 is necessary to fill the gap between the two. Other gearing examples, such as planetary gearing can be used.

Figure 10:
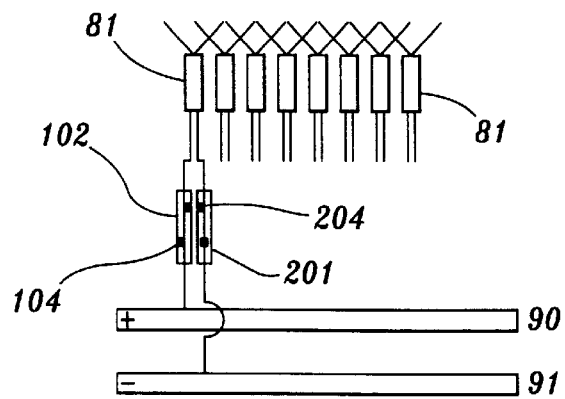
FIG. 10 illustrates an example of a solid state commutating arrangement of a single segment.

FIG. 10 illustrates a design using an optically triggered photo sensor to control the conduction of a solid state device in order to make the angular speed of the rotor selectively different from that of the rotating electromagnetic field. A contemporary solid state transistor such as CM 300 HA-IZE can switch 500 amperes in current at 500 volts. This is more than enough for the task. Commutator elements 81 are connected to a pair of optically coupled solid state devices 102 and 201, one in the positive direction and the other in the negative. These solid state devices are terminated at their respective current bus bars 90 and 91 that supply current to the rotor windings. It is also an aspect of the disclosed system that the positive and negative bus bars 90 and 91 may be in the form of a ring. The positive device 102 has an optical sensor 104 and the negative device 201 has an optical sensor 204. The device will be triggered by a light emitting diode or any well-defined optical switching system to replace the mechanical rotating brushes. The bus bar can be connected in the same way as in the regular synchronized generator/motor therefore making it a brushless machine.

FIGS. 11a–11d illustrate some of the characteristics of a mechanical brush system. When the brush is in contact with two commutator elements, it short circuits a segment of the coil, and the trapped magnetic energy has to be released before the current can be reversed. This tends to cause a surge current and a visible spark. FIG. 1d illustrates the fact that the brush commutation is a step function, which happens suddenly. Because of the inductance of the coil, therefore, the actual commutation is not as ideal as a linear changeover.

FIG. 12a illustrates a square wave electrical pulse resulting from the non-linear brush commutation. This can also happen with optical coupling, but with a buffing (smoothing) circuit one can shape the pulse into a bell shape (FIG. 12b) allowing the current to release essentially linearly. FIG. 12b illustrates the envelope of individual pulses—e.g., if three pulses are used, the central one would be higher than the two flanking pulses.

Figure 13:
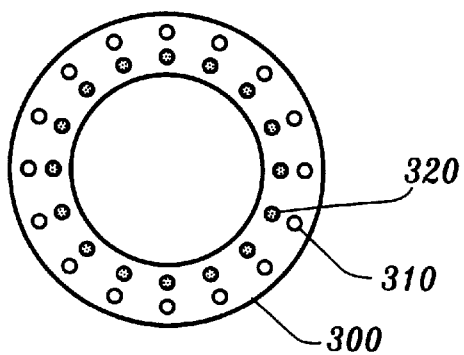
FIG. 13 illustrates an optical coupling wheel for the stator and the rotor.

FIG. 13 illustrates an example of an optical ring arrangement used in producing a rotating electromagnetic field whose angular speed can differ selectively from that of the rotor of an electrical machine. A stationary ring 300 is an opaque and insulating material with individual photo emitting devices 310 and 320 to trigger the positive and negative current controlling circuits. The emitters 310 and 320 light up in a time sequence to simulate rotation in the stationary ring 320. Device 310 triggers the positive element (such as 102 in FIG. 10) and device 320 triggers the negative element (such as 201 in FIG. 10). The ring can be shaped as a cylinder or another shape without significantly changing its function or effectiveness.

Figure 14:
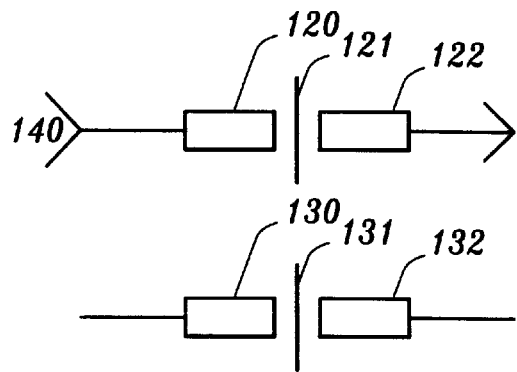
FIG. 14 illustrates an example of using two different colored light emitting diodes (LEDs) coupled through colored filters to transmit a signal to photo diodes.

FIG. 14 is another example of an optical coupling that can be used in producing a rotating electromagnetic field whose angular speed can selectively differ from that of the rotor in an electrical machine. Light emitter 120 is triggered by a source 140. Light passes through an optical (e.g. red) filter 121. A rotating sensor 122, having a red filter in front of it, picks up the light signal from emitter 120 without undue interference. A green element 130 at the 180 degrees position is triggered simultaneously and light therefrom passes through a green filter 131 and is detected by a rotating sensor 132 that, when triggered by light from emitter 130, conducts a negative current. Therefore, the red and green elements function as the brushes and commutators, but with improved electronic control and improved performance. The emitters can be triggered in a sequence controlled as discussed below in connection with FIGS. 15a and 15b.

Figure 15A:
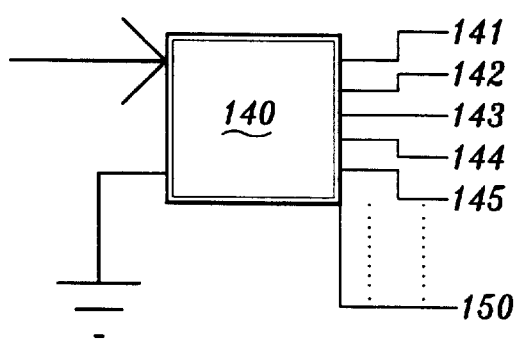
FIGS. 15a and 15b illustrate a solid state pulse generator with a controlled delay to sequentially trigger the LEDs.
Figure 15B:
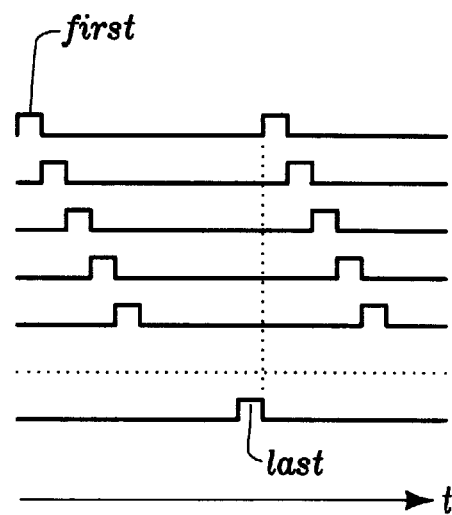

FIG. 15a illustrates a solid state device with a signal going through a digital delay circuit 140 to produce a precisely delayed square wave signal, 141, 142, . . . 150 and back, shaped as illustrated in FIG. 15b to simulate the commutating light signal.

Figure 16A:
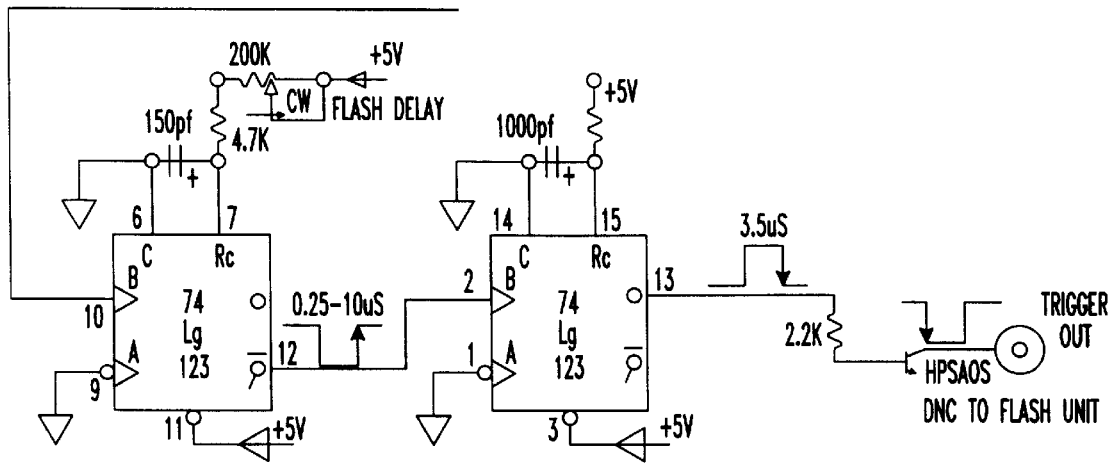
FIG. 16a illustrates an integrated chip circuit for generating square pulses.
Figure 16B:
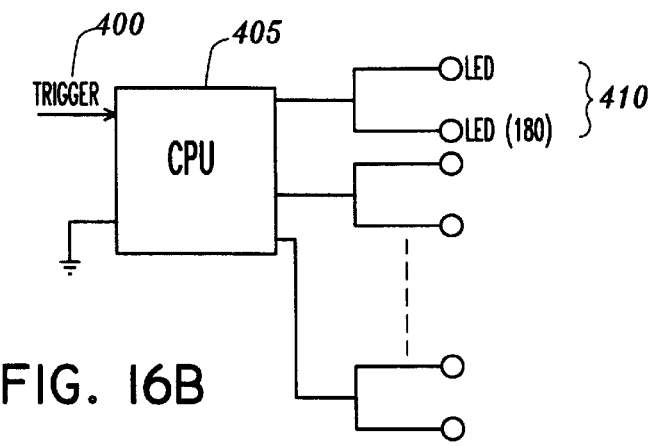
FIG. 16b illustrates a circuit converting trigger pulses into routing signals.
Figure 16C:
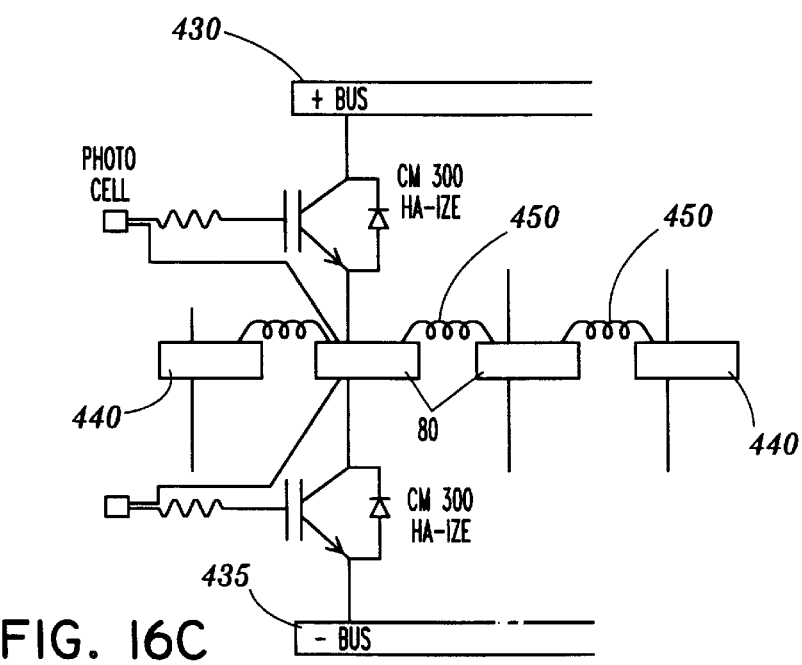
FIG. 16c illustrates a high voltage and high current circuit with photo diodes as trigger inputs, and the arrangement of a single commutating segment.
Figure 17:
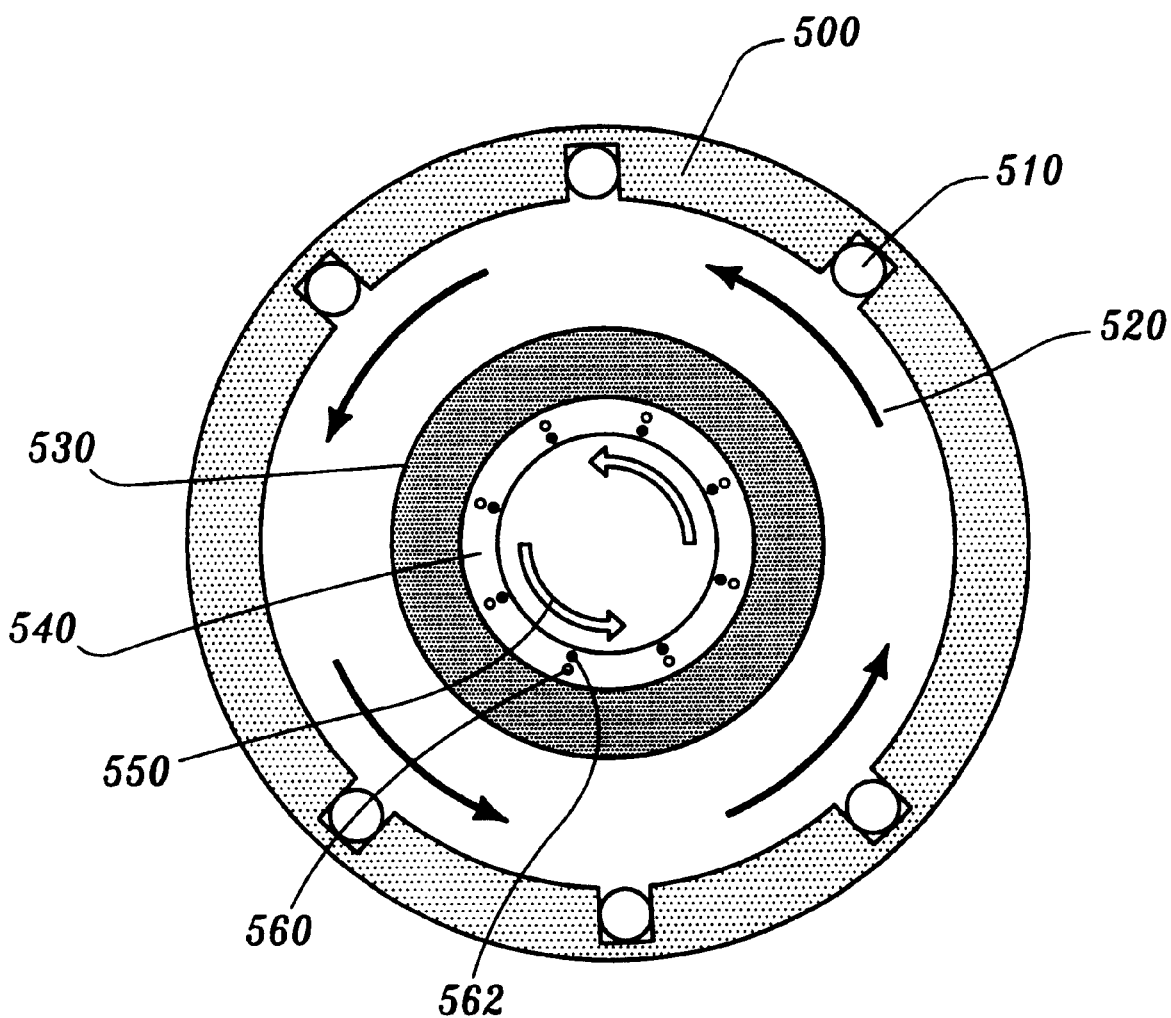
FIG. 17 illustrates a sectional view through an electric machine.

FIGS. 16a–16c illustrate solid state circuits that can perform the desired functions discussed in connection with FIGS. 13–15b. FIG. 16a illustrates a circuit for creating variable width square-wave pulses (as seen in FIG. 15b) which trigger the light-emitting circuits previously described. FIG. 16b illustrates the configuration of a control circuit 405 that receives triggering pulses 400 and activates light emitting pairs 410 in a selected sequence. FIG. 16c illustrates another configuration of the brushless optical switching circuit described in FIG. 10 with the addition of armature windings 450 connecting commutator elements 440. Newer devices may be available in the future, but that does not change the intended function of the system and method disclosed herein FIG. 17 illustrates in cross section principal components of a rotating field electrical machine. Stator 500 has stator coils 510 and commutator segments 530 are electrically coupled to armature winding carried by a rotor (not shown) rotating inside stator 500 at steady-state. Assuming that the machine is operated as a generator at steady-state, the armature winding produce a rotating electromagnetic field 520 that induces current in stator windings 510 that is supplied to a load. The emitters 560 are controlled by an optical switching arrangement such as discussed earlier so as to activate photodiodes 562 to control the supply of electrical current to commutator segments 530 in a sequence illustrated by arrows 550 designed to rotate field 520 at the desired angular speed, taking into account the mechanical rotation speed of the rotor that carries commutator segments 530. The two angular speeds (of the rotor and of field 520) can differ by a selected amount determined by the sequence of energizing emitters 560, which can be done under electronic or even software control thus allowing freedom in selecting and/or changing that difference in speed. Assuming that the machine is operated as a motor, similar considerations apply in that the rotating field's angular speed can be selectively different from that of the rotor that carries commutator segments 530.

Method

In a conventional generator/motor, the armature and the magnetic field it produces typically rotate essentially at the synchronized speed of the field winding. This forces the armature to rotate at the synchronized speed only. In contrast, the disclosed system and method use a synchronized magnetic field speed at the armature level yet allow the physical armature speed to be some other value. This is accomplished by a rotating commutating system that is driven mechanically or electronically (e.g., through a computer) controlled so that the brush speed $\omega_B$ equals the field rotating speed $\omega_F$ regardless of the armature speed $\omega_A$ (i.e., $\omega_B=\omega_F$), taking into account approximations due to unique geometry. The difference in the armature speed and the brush speed may be sustained and is known as the differential speed (differential speed=$\omega_A-\omega_B$). This allows back e.m.f. for self-limiting of the runaway speed, and computer feedback by sensing the armature shaft speed. The magnetic field speeds are at a phase angle to electronically generate a "brush speed", so that the resultant armature magnetic field is rotating synchronized and in phase.

Thus, the system and method disclosed in this patent specification can obviate the need for a heavy and complicated mechanical gearbox by using an electronically controlled torque converting system for AC and DC electric motor/generator systems. This saves weight, complexity, and cost. The optically controlled brush movement system is particularly effective in AC synchronized power applications. It is known that the brush position should be changed or adjusted when the motor is changing speed. In the past, a third brush was created to move around at a different speed. That can be replaced by the optically coupled commutation where only a fraction of the ring is necessary and the light emitter can be automatically adjusted around the maximum field strength position through feed back. The disclosed system and method can make the packaging of electric power generation sets extremely simple, at lower cost and lower weight. The disclosed system and method can thus combine the concept of a DC electric motor/generator and an AC synchronized motor/generator with the concept of optically coupled commutation, and if gearing is used it need not be torque carrying. As an energy converting device, if the motor is generating synchronized power and yet the rotor is rotating at say high speed, the torque times rotating speed is power too, thus the input shaft can transmit power at lower torque. This essentially accomplishes the task of a mechanical gearbox without incurring its cost and other undesirable consequences. The ramifications of this approach may be so fundamental that they change electromotive system designs for applications such as electric automobiles and the operation of synchronized hydro turbines, which are often not optimized for partial load operations. The applications are numerous.

The disclosed system and method are made particularly convenient by the current availability of suitable solid state switching devices. Soft coupling can be achieved using devices other than optical systems, such as localized magnetic pulses or electric field effect devices. Of course, the disclosed system and method by no means rule out the brush system. The mechanical brush system can be particularly practical in miniature sizes and for special applications.

While the above description provides a full and complete disclosure of preferred embodiments of the invention, various modification, alternate constructions and equivalents may be employed without departing from the true spirit and scope of the invention. Therefore, the above description and illustrations should not be construed as limiting the scope of the invention, which is defined by the appended claims.

What is claimed is:

1. A synchronous electrical machine operating at steady-state as a power generator or as a motor, comprising:
   a non-rotating stator;
   an armature rotating relative to the stator at a first angular speed and producing an armature magnetic field rotating relative to the stator at a second angular speed that differs by a selected amount from the first angular speed at steady state.

2. An electrical machine as in claim 1 in which the armature comprises a number of windings connected to respective commutator segments and a power source supplying power to the segments in a time sequence corresponding to the second angular speed while the armature rotates at the first angular speed at steady state.

3. An electrical machine as in claim 2 in which the power source comprises a switching arrangement powering the commutator segments in a selected sequence at steady state.

4. An electrical machine as in claim 3 in which the switching arrangement comprises a set of light emitters energized in a selected sequence and a set of light detectors responding to energization of the light emitters to enable switching elements powering respective commutator segments at steady state.

5. A synchronous electrical machine operating at steady-state as a power generator or as a motor, comprising:
   a stator;
   an armature rotating relative to the stator at a first angular speed and producing an armature magnetic field rotating relative to the stator at a second angular speed that differs by a selected amount from the first angular speed;
   in which the armature comprises a number of windings connected to respective commutator segments and a power source supplying power to the segments in a time sequence corresponding to the second angular speed while the armature rotates at the first angular speed;
   in which the power source comprises a switching arrangement powering the commutator segments in a selected sequence; and
   in which the switching arrangement comprises brushes making electrical contact with the commutator segments, wherein the brushes rotate relative to the stator at an angular speed that is different from that of the armature and is related to said second angular speed.

6. An electrical machine as in claim 5 including a gearing arrangement between the brushes and the armature to rotate the brushes relative to the armature.

7. A method of operating an electrical machine at steady-state, comprising:
   rotating an armature relative to a non-rotating stator at an armature angular speed;
   said armature having windings and producing an armature field rotating relative to a stator at a field angular speed;
   supplying electrical power to the armature windings in a selected sequence causing said armature angular speed and said field angular speed to differ by a selected amount at steady state.

8. A method as in claim 7 in which said supplying comprises coupling the armature windings to a power source through an optical switching arrangement that powers the windings in said selected sequence at steady state.

9. A method as in claim 7 in which said supplying comprises coupling the armature winding to a power source through commutators that rotate at the armature speed and brushes that rotate at a different angular speed that matches the field speed at steady state.

10. A method of generating electric current in which an armature and an electro-magnetic field rotate at selected different angular velocities at steady-state, comprising:

rotating an armature carrying armature windings and commutator segments coupled thereto at a selected angular speed relative to a non-rotating stator carrying stator windings;

transmitting electrical power to selected commutator segments in a selected sequence through a switching arrangement that is in electrical communication with said commutator segments and an electric power source;

said transmitting of electrical power to said commutator segments and thus to said armature windings producing a magnetic field surrounding said armature and rotating at a selected angular speed relative to the stator and in turn producing electrical current in said stator windings; and controlling said selected sequence of transmitting electric power to the commutator segments to maintain a selected difference between the angular speed of the armature relative to the stator and the angular speed of the magnetic field produced by the armature windings relative to the stator at steady state.

11. A method as in claim 10 in which said controlling comprises controlling the operation of an optical coupling arrangement of light emitters and light-responsive switching elements coupled with said commutator segments, said emitters being activated in a selected sequence related to the angular speeds of the armature and the field relative to the stator at steady state.

12. A method of generating electric current in which an armature and an electro-magnetic field rotate at selected different angular velocities at steady-state, comprising:

rotating an armature carrying armature windings and commutator segments coupled thereto at a selected angular speed relative to a stator carrying stator windings;

transmitting electrical power to selected commutator segments in a selected sequence through a switching arrangement that is in electrical communication with said commutator segments and an electric power source;

said transmitting of electrical power to said commutator segments and thus to said armature windings producing a magnetic field surrounding said armature and rotating at a selected angular speed relative to the stator and in turn producing electrical current in said stator windings; and controlling said selected sequence of transmitting electric power to the commutator segments to maintain a selected difference between the angular speed of the armature relative to the stator and the angular speed of the magnetic field produced by the armature windings relative to the stator;

in which said controlling comprises rotating brushes through which a source of electric power is coupled to said commutator segments at an angular speed relative to the stator differs from the angular speed of the armature relative to the stator by an amount related to the difference between the angular speeds of the armature and the field relative to the stator.

13. A synchronous electrical machine comprising:

a stator having stator windings;

an armature having field windings and rotating relative to the stator windings at a first angular speed and producing an armature magnetic field rotating relative to the stator windings at a second angular speed that differs by a selected amount from the first angular speed at steady state.

14. A synchronous electrical machine as in claim 13 in which the armature comprises a number of windings connected to respective commutator segments and a power source supplying power to the segments in a time sequence corresponding to the second angular speed while the armature rotates at the first angular speed at steady state.

15. A synchronous electrical machine as in claim 14 in which the power source comprises a switching arrangement powering the commutator segments in a selected sequence at steady state.

16. A synchronous electrical machine as in claim 15 in which the switching arrangement comprises a set of light emitters energized in a selected sequence and a set of light detectors responding to energization of the light emitters to enable switching elements powering respective commutator segments at steady state.

17. A synchronous electrical machine as in claim 15 in which the switching arrangement comprises brushes making electrical contact with the commutator segments, wherein the brushes rotate relative to the stator at an angular speed that is different from that of the armature and is related to said second angular speed.

18. A synchronous electrical machine as in claim 17 including a gearing arrangement between the brushes and the armature to rotate the brushes relative to the armature.

19. A method of operating an electrical machine at steady-state, comprising:

rotating an armature relative to a stator at an armature angular speed;

said armature having windings and producing an armature field rotating relative to the stator at a field angular speed;

supplying electrical power to the armature windings in a sequence that effectively rotates the armature field at an angular speed that differs by a selected amount from the angular speed of the armature windings at steady state.

20. A method as in claim 19 in which said supplying comprises coupling the armature windings to a power source through an optical switching arrangement that powers the windings in said sequence.

21. A method as in claim 19 in which said supplying comprises coupling the armature winding to a power source through commutators that rotate at the armature speed and brushes that rotate at a different angular speed that matches the field speed at steady state.

22. A method as in claim 19 in which said method comprises operating an AC machine.

* * * * *